(12) United States Patent
Chuang et al.

(10) Patent No.: US 10,403,002 B2
(45) Date of Patent: Sep. 3, 2019

(54) METHOD AND SYSTEM FOR TRANSFORMING BETWEEN PHYSICAL IMAGES AND VIRTUAL IMAGES

(71) Applicant: National Chiao Tung University, Hsinchu (TW)

(72) Inventors: Jen-Hui Chuang, Hsinchu (TW); Yi-Yu Hsieh, Hsinchu (TW); Yu-Han Wei, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 269 days.

(21) Appl. No.: 15/222,340

(22) Filed: Jul. 28, 2016

(65) Prior Publication Data

US 2017/0337707 A1  Nov. 23, 2017

(30) Foreign Application Priority Data

May 20, 2016 (TW) .............................. 105115704 A

(51) Int. Cl.
*G01C 3/08* (2006.01)
*G06T 7/60* (2017.01)
(Continued)

(52) U.S. Cl.
CPC ............... *G06T 7/80* (2017.01); *G06T 7/60* (2013.01); *H04N 5/247* (2013.01); *G01C 3/08* (2013.01);
(Continued)

(58) Field of Classification Search
CPC ... G06T 7/80; G06T 7/60; G06T 2207/30244; G06T 2207/30242; H04N 5/247; G01C 3/08
See application file for complete search history.

(56) References Cited

U.S. PATENT DOCUMENTS 8,824,779 B1 * 9/2014 Smyth .................. G06K 9/0061
382/100
9,076,033 B1 * 7/2015 Barron ............... G06K 9/00355
(Continued)

FOREIGN PATENT DOCUMENTS

JP     2011070579 A  *  4/2011
JP     2011070579 A  *  4/2011
(Continued)

OTHER PUBLICATIONS

J. Corso "Basic Stereo and Epipolar Geometry" EECS 598-08 Fall 2014 Foundations of Computer Vision, College of Engineering, Electrical Engineering and Computer Science, University of Michigan (Year: 2014).*

*Primary Examiner* — Richard A Hansell, Jr.
(74) *Attorney, Agent, or Firm* — Mintz Levin Cohn Ferris Glovsky and Popeo, P.C.; Peter F. Corless; Steven M. Jensen

(57) ABSTRACT

A method for transforming between physical and virtual images includes: disposing an image capturing device at a position that does not coincide with line-of-sight of a user; providing at least three physical distance references on the line-of-sight of the user at different distances from the user, and capturing images of the at least three physical distance references by the image capturing device so as to obtain an epipolar line formed by at least three virtual distance references corresponding respectively to the images; and obtaining a first relation by a computing unit according to a position corresponding relationship between the at least three physical distance references and the at least three virtual distance references. By using the image capturing device that is at a fixed position relative to the user and does not coincide with the line-of-sight of the user, the physical position of an object is obtained.

18 Claims, 14 Drawing Sheets

(51) Int. Cl.
*G06T 7/80* (2017.01)
*H04N 5/247* (2006.01)

(52) U.S. Cl.
CPC ............... *G06T 2207/30242* (2013.01); *G06T 2207/30244* (2013.01)

(56) References Cited

U.S. PATENT DOCUMENTS

| | | | | |
|---|---|---|---|---|
| 2007/0081695 | A1* | 4/2007 | Foxlin | G06T 7/73 382/103 |
| 2011/0285858 | A1* | 11/2011 | Chen | G06T 7/80 348/187 |
| 2012/0019530 | A1* | 1/2012 | Baker | G02B 27/2207 345/419 |
| 2012/0206597 | A1* | 8/2012 | Komoto | G06K 9/00805 348/135 |
| 2014/0002617 | A1* | 1/2014 | Zhang | G01N 15/1463 348/48 |
| 2016/0012643 | A1* | 1/2016 | Kezele | G02B 27/0172 345/633 |

FOREIGN PATENT DOCUMENTS

| | | | | |
|---|---|---|---|---|
| KR | 20160007423 A | * | 1/2016 | ........... G06T 19/006 |
| KR | 20160007423 A | * | 1/2016 | ......... G02B 27/0172 |

\* cited by examiner

METHOD AND SYSTEM FOR TRANSFORMING BETWEEN PHYSICAL IMAGES AND VIRTUAL IMAGES

CROSS-REFERENCE TO RELATED APPLICATION

This application claims under 35 U.S.C. § 119(a) the benefit of Taiwanese Patent Application No. 105115704 filed May 20, 2016, the entire contents of which are incorporated herein by reference.

BACKGROUND OF THE INVENTION

1. Field of the Invention

The present invention relates to image transforming technologies, and, more particularly, to a method and system for transforming between physical images and virtual images.

2. Description of Related Art

In current physical and virtual images capturing and transforming technologies, a projector can be used to project visible special structured light on a surface of an object, and a camera disposed at a fixed position relative to the projector can be used to capture the special structured light on the surface of the object for image analysis and calculation, thereby calculating the distance between positions of the projector and the object. In addition to a general camera, the projector serves as a light source for projecting visible light on a target object and is required to be disposed in a darkroom for projecting structured light with different energy levels, but such a system hardware structure is not easy to carry. Further, projected structured light may be adversely affected by other light sources under general environment, thus causing luminance attenuation and miscalculation and hindering the application of the system hardware structure in portable or wearable device systems.

If a fixed camera having a polarization mask is used to monitor an LCD screen, the polarization mask blocks light of a certain phase projected from the LCD screen while allowing natural light at other phases to pass through. As such, only a frame of the LCD screen can be seen from a captured image. When a laser pointer is used by a user to project laser light on the LCD screen, since the direction of the laser light is controllable, the laser light can be controlled so as to be prevented from being blocked by the mask. As such, the camera can detect the laser point so as to calculate the relative position of the laser light in the screen. Then, a sensor disposed at an edge of the screen detects the position of a mouse cursor and compares it with the relative position of the laser light so as to control the movement of the mouse cursor and achieve a computer pointing function.

Further, if an air cushion pressure detector is used as a pillow to improve the above-described LCD screen monitoring method by using the fixed camera having the polarization mask, the user uses his head to apply pressure to the pillow so as to control a mechanically rotatable cradle head. Therein, the mechanically rotatable cradle head has a camera and a laser pointer mounted thereon. The camera is used to calculate the relative position of laser light projected on the projection screen, thus achieving a pointing function.

Alternatively, a laser pointer is combined with a spectacle frame that is wearable by the user in the prior art. A fixed camera captures the position of laser light so as to achieve a pointing function. Such a method is not limited to pointing of a computer system. For example, it may also be applied in spatial pointing. In particular, laser light is projected on a surrounding object so as to inform people around. However, since colored laser light is used to facilitate the camera to capture a pointed position, the position where the user is pointing at will also be known by other people, thus resulting in a lack of privacy. In addition, a cradle head with a fixed position is required for mounting the camera. As such, the resulting structure is not easy to carry and hence it is not suitable to be applied in portable or wearable device systems.

Therefore, how to overcome the above-described drawbacks has become critical.

SUMMARY OF THE INVENTION

In view of the above-described drawbacks, the present invention provides a method for transforming between physical images and virtual images, which comprises steps of: disposing a first image capturing device at a position that does not coincide with line-of-sight of a user; providing at least three physical distance references on the line-of-sight of the user at different distances from the user, and capturing images of the at least three physical distance references by the first image capturing device so as to obtain an epipolar line formed by at least three virtual distance references corresponding respectively to the images; and according to a position corresponding relationship between the at least three physical distance references and the at least three virtual distance references, obtaining a first relation between distances of the at least three physical distance references from the user and positions of the at least three virtual distance references on the epipolar line by a computing unit that is coupled to the first image capturing device.

The present invention further provides a system for transforming between physical images and virtual images, which comprises: a first image capturing device disposed at a position that does not coincide with line-of-sight of a user for capturing images of at least three physical distance references on the line-of-sight of the user at different distances from the user so as to obtain an epipolar line formed by at least three virtual distance references corresponding respectively to the images; and a computing unit coupled to the first image capturing device for obtaining a first relation between distances of the at least three physical distance references from the user and positions of the at least three virtual distance references on the epipolar line according to a position corresponding relationship between the at least three physical distance references and the at least three virtual distance references.

In addition, the present invention provides another system for transforming between physical images and virtual images, which comprises: a first image capturing device disposed at a position that does not coincide with line-of-sight of a user, wherein the first image capturing device captures images of at least three physical distance references located at an approximate straight line on the line-of-sight of the user at different distances from the user so as to obtain an epipolar line formed by at least three virtual distance references corresponding respectively to the images, after at least four physical plane components are provided at known positions in a physical plane on the line-of-sight of the user and at known relative distances from one another, the first image capturing device captures images of the at least four physical plane components so as to obtain at least four virtual plane components corresponding respectively to the images and located at known positions in a virtual plane, and after an object is provided in the physical plane, the first image capturing device captures an image of the object on the epipolar line so as to generate a virtual object corresponding to the object; and a computing unit coupled to the first image capturing device, wherein the computing unit obtains a first relation between distances of the at least three physical distance references from the user and positions of the at least three virtual distance references on the epipolar line according to a position corresponding relationship between the at least three physical distance references and the at least three virtual distance references, the computing unit further obtains distances between the user and the at least four physical plane components through the first relation, and obtains a coordinate transformation matrix according to a corresponding relationship between physical positions of the at least four physical plane components and positions of the at least four virtual plane components in the virtual plane, further, the computing unit obtains positions of all physical points in the physical plane that correspond to all virtual points on the epipolar line in the virtual plane through the coordinate transformation matrix according to positions of said all virtual points on the epipolar line in the virtual plane, also, the computing unit obtains distances between the user and said all physical points in the physical plane according to the known relative distances between the at least four physical plane components and the distances between the user and the at least four physical plane components and the positions of said all physical points in the physical plane, furthermore, the computing unit obtains a third relation according to the positions of said all virtual points on the epipolar line in the virtual plane and the distances between the user and said all physical points in the physical plane, and then compares the first relation with the third relation to obtain a point of intersection therebetween.

Therefore, by using an image capturing device that is located at a fixed position relative to the user and does not coincide with the line-of-sight of the user, the present invention captures images of substances (physical distance references) to generate virtual images. Further, by using a computing unit, the present invention obtains the physical position of an object through the position relation between the physical positions of the substances and the virtual positions of the virtual images in a virtual space (pixel coordinates). Hence, the present invention is applicable to portable or wearable device systems.

DETAILED DESCRIPTION OF PREFERRED EMBODIMENTS

The following illustrative embodiments are provided to illustrate the disclosure of the present invention, these and other advantages and effects can be apparent to those in the art after reading this specification. Various modifications and variations can be made without departing from the spirit of the present invention.

Figure 1:
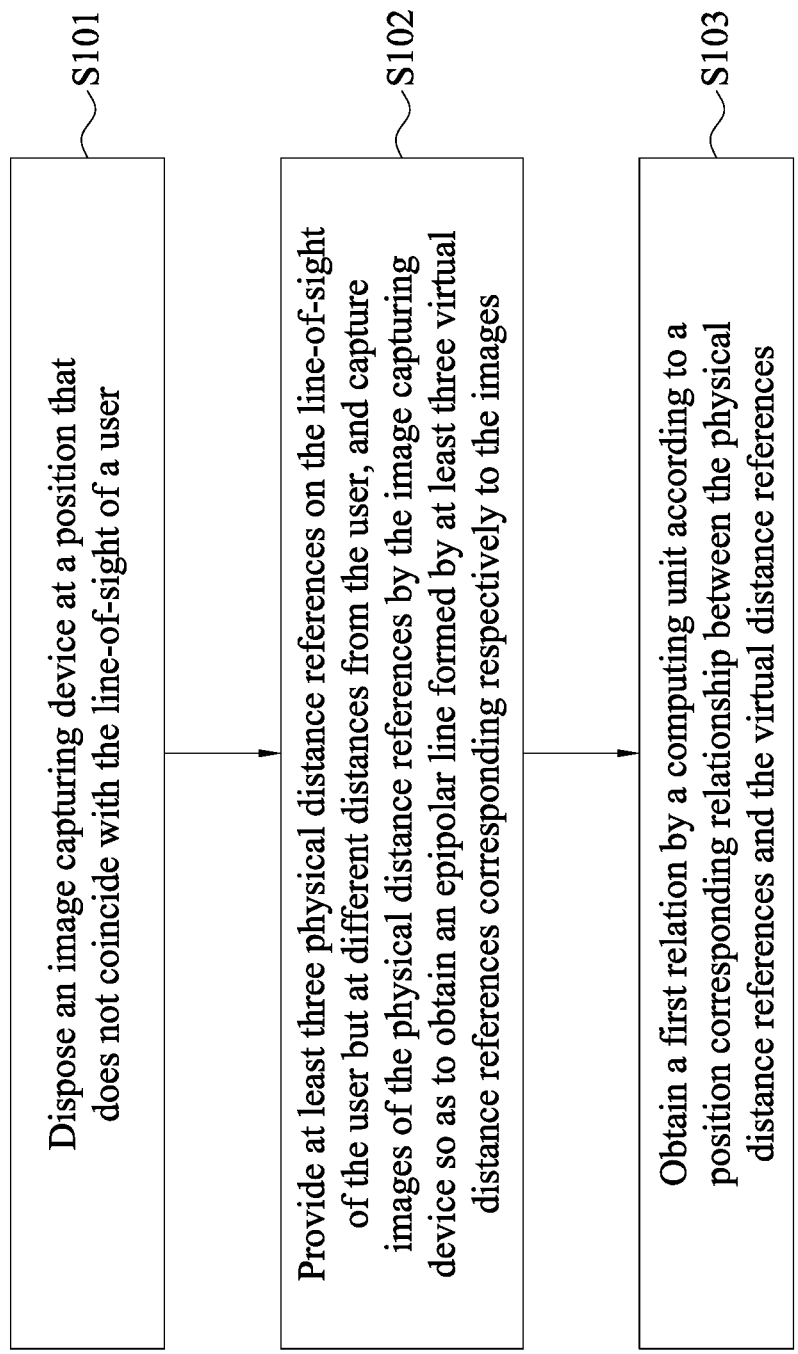
FIG. 1 is a schematic flow diagram showing a method for transforming between physical images and virtual images according to the present invention.
Figure 2:
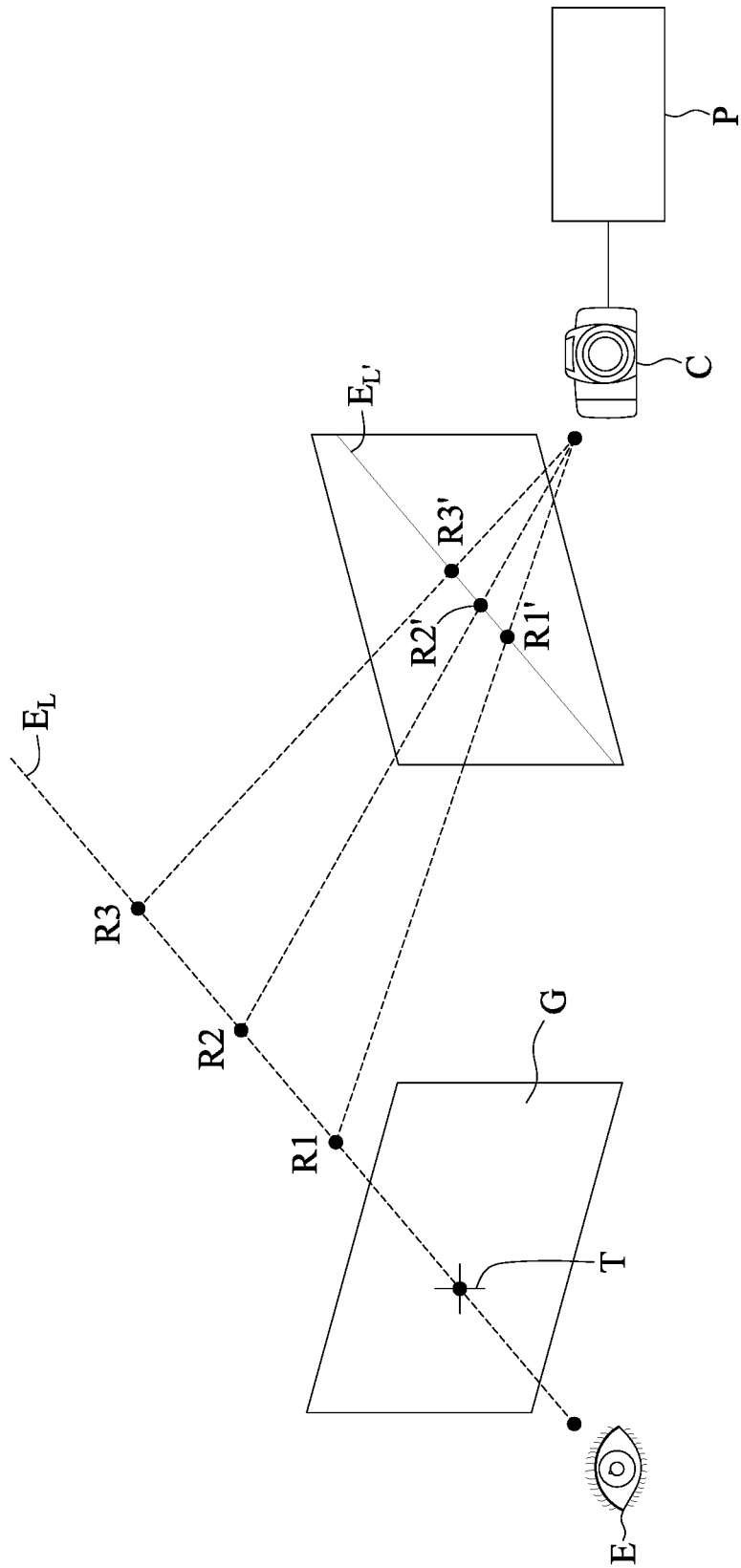
FIG. 2 is a schematic diagram of a structure using the method of FIG. 1.
Figure 3:
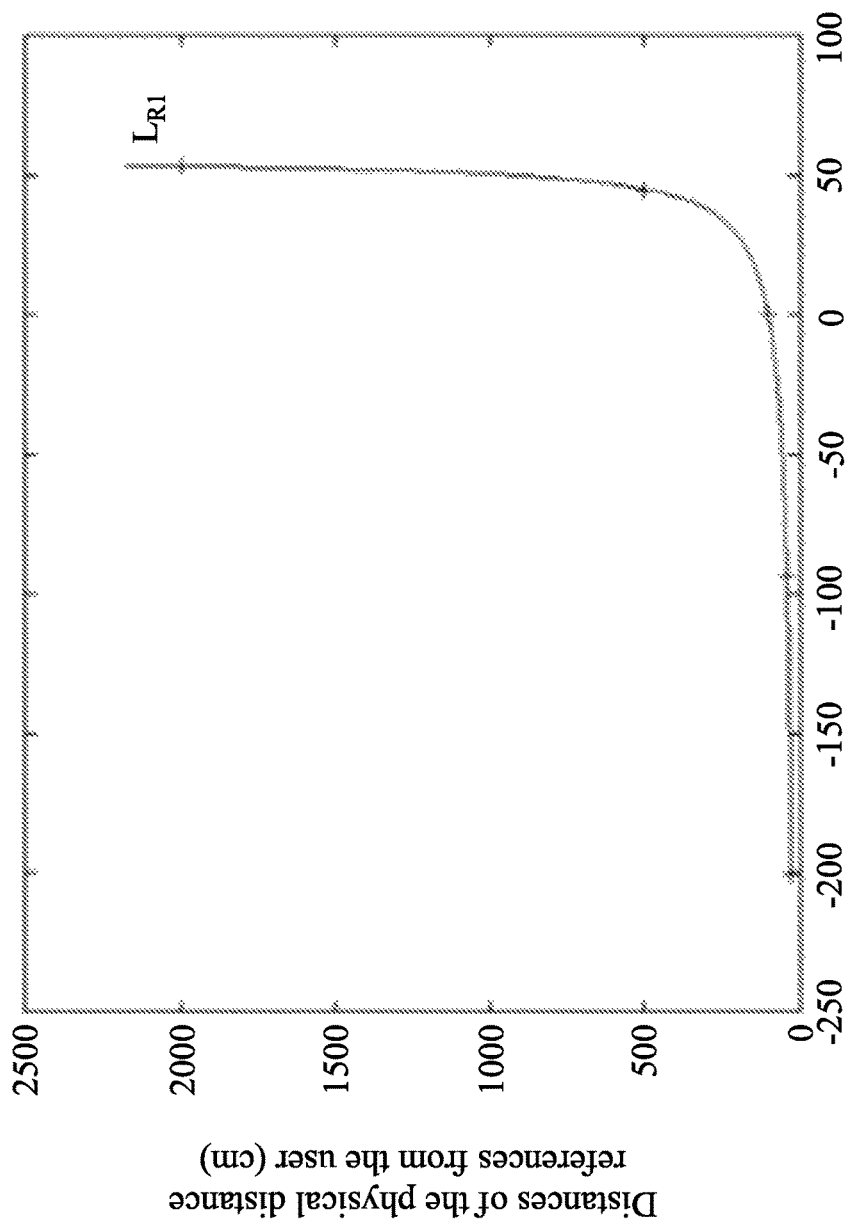
FIG. 3 is a plot diagram showing a result obtained from the method of FIG. 1.

FIG. 1 is a schematic flow diagram showing a method for transforming between physical images and virtual images according to the present invention, FIG. 2 is a schematic diagram of a structure using the method of FIG. 1, and FIG. 3 is a plot diagram showing a result obtained from the method of FIG. 1.

Referring to FIGS. 1 and 2, first, at step S101, an image capturing device C is disposed at a position that does not coincide with the line-of-sight $E_L$ of a user E. For example, the image capturing device C is a camera of Google glasses, and particularly, the user E refers to an eye of a person. The position relationship between the image capturing device C and the user E (i.e., eye) is fixed during operation.

Then, at step S102, at least three physical distance references, for example, a first physical distance reference R1, a second physical distance reference R2 and a third physical distance reference R3, are provided on the line-of-sight $E_L$ of the user E at different distances from the user E, and images of the first, second and third physical distance references R1, R2, R3 are captured by the image capturing device C so as to obtain an epipolar line $E_{L'}$ formed by at least three virtual distance references (for example, a first virtual distance reference R1', a second virtual distance reference R2' and a third virtual distance reference R3') corresponding respectively to the images. In particular, the distances of the first, second and third physical distance references R1, R2, R3 from the user are 25 cm, 40 cm and 100 cm, respectively. Since image drifting of the references easily occur due to head shaking of the user E, a plurality of images such as 10 images can be continuously captured by the image capturing device C and then an average position, a peak position or a weighted position can be calculated, thus obtaining the epipolar line $E_{L'}$ through an approximate method.

Referring to FIG. 2, a visual device G is further disposed between the user E and the three physical distance references for displaying a mark T, thereby prompting the eye of the user E to focus at a point so as to avoid drifting of the line-of-sight $E_L$ caused by an eye movement and ensure an accurate position of the epipolar line $E_{L'}$. For example, the visual device G is a lens or display that is transparent at least to a certain extent, and the mark T can be displayed, mechanically positioned or projected on the visual device G on the line-of-sight $E_L$ and arranged in a line with the three physical distance references.

Thereafter, at step S103, according to a position corresponding relationship between the first to third physical distance references R1, R2, R3 and the first to third virtual distance references R1', R2', R3', a first relation (as shown in FIG. 3) between the distances of the first to third physical distance references R1, R2, R3 from the user E and the positions of the first to third virtual distance references R1', R2', R3' on the epipolar line $E_{L'}$ is obtained by a computing unit P that is at least coupled to the image capturing device C. In particular, since the distances of the first to third physical distance references R1, R2, R3 from the user E are known, and the pixel positions (obtained through, for example, relative coordinate transformation) of the first to third virtual distance references R1', R2', R3' on the image capturing device C are also known, the computing unit P can obtain the distance corresponding relationship between the physical distance references and the virtual distance references and thereby obtain a first relation curve $L_{R1}$ of the first relation.

Figure 4:
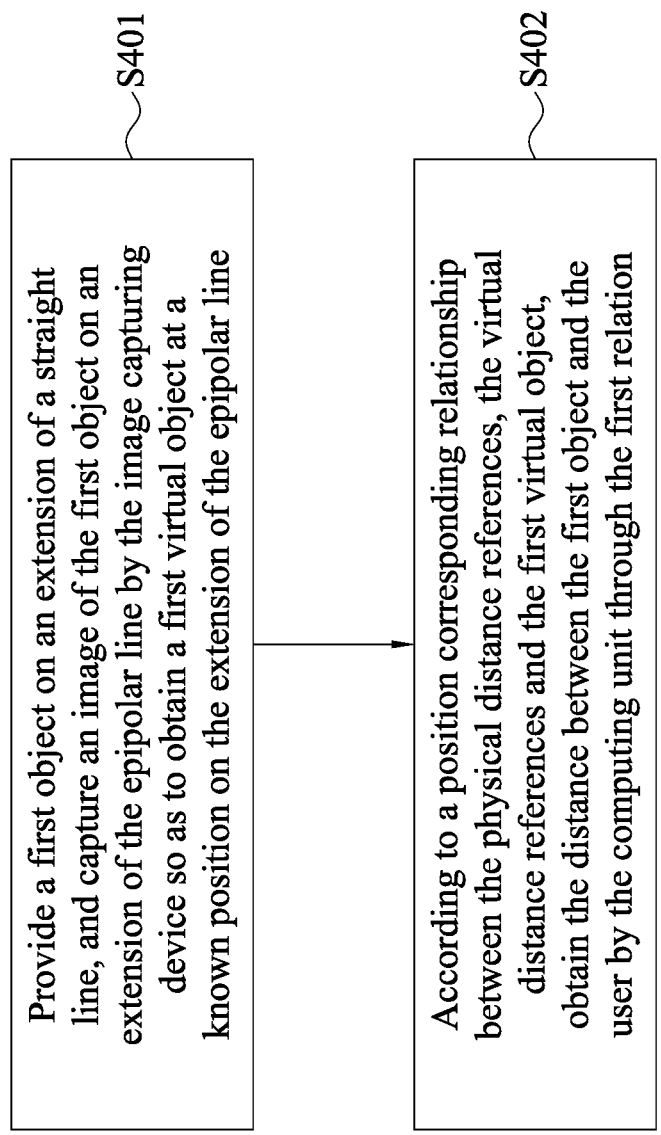
FIG. 4 is a schematic flow diagram showing a method for transforming between physical images and virtual images according to an aspect of the present invention.
Figure 5:
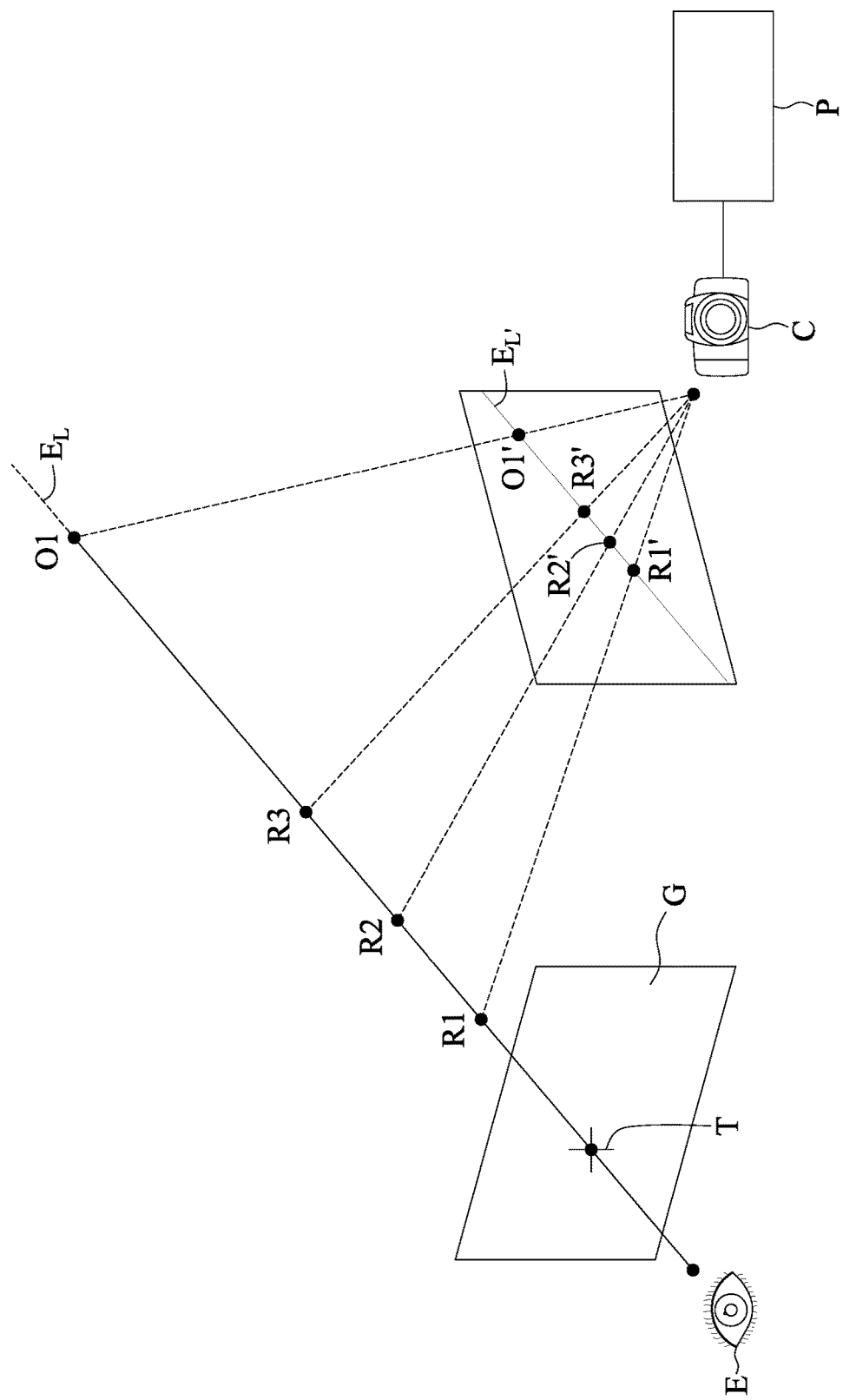
FIG. 5 is a schematic diagram of a structure using the method of FIG. 4.

FIG. 4 is a schematic flow diagram showing a method for transforming between physical images and virtual images according to an aspect of the present invention, and FIG. 5 is a schematic diagram of a structure using the method of FIG. 4.

Referring to FIGS. 4 and 5, step S401 is continued from step S103. At step S401, a first object O1 is provided on an extension of a straight line (i.e., the line-of-sight $E_L$ of FIG. 2) formed by the at least three physical distance references, and an image of the first object O1 on an extension of the epipolar line $E_{L'}$ is captured by the image capturing device C so as to obtain a first virtual object O1' at a known position (i.e., pixel position) on the extension of the epipolar line $E_{L'}$.

Then, at step S402, according to a position corresponding relationship between the first to third physical distance references R1, R2, R3, the first to third virtual distance references R1', R2', R3' and the first virtual object O1', the distance between the first object O1 and the user E is obtained by the computing unit P through the first relation. In particular, according to the position of the first virtual object O1' on the extension of the epipolar line $E_{L'}$, i.e., on the x-axis of the first relation curve $L_{R1}$, a corresponding point is located on the first relation curve $L_{R1}$ and its y-axis coordinate is the distance between the first object O1 and the user E. The computing unit P can obtain the distance between the first object O1 and the user E by using the following cross-ratio equation (1).

$$\frac{\overline{R1R2}^* \overline{R3O1}}{\overline{R2O1}^* \overline{R1R3}} = \frac{\overline{R1'R2'}^* \overline{R3'O1'}}{\overline{R2'O1'}^* \overline{R1'R3'}} \quad (1)$$

Figure 6:
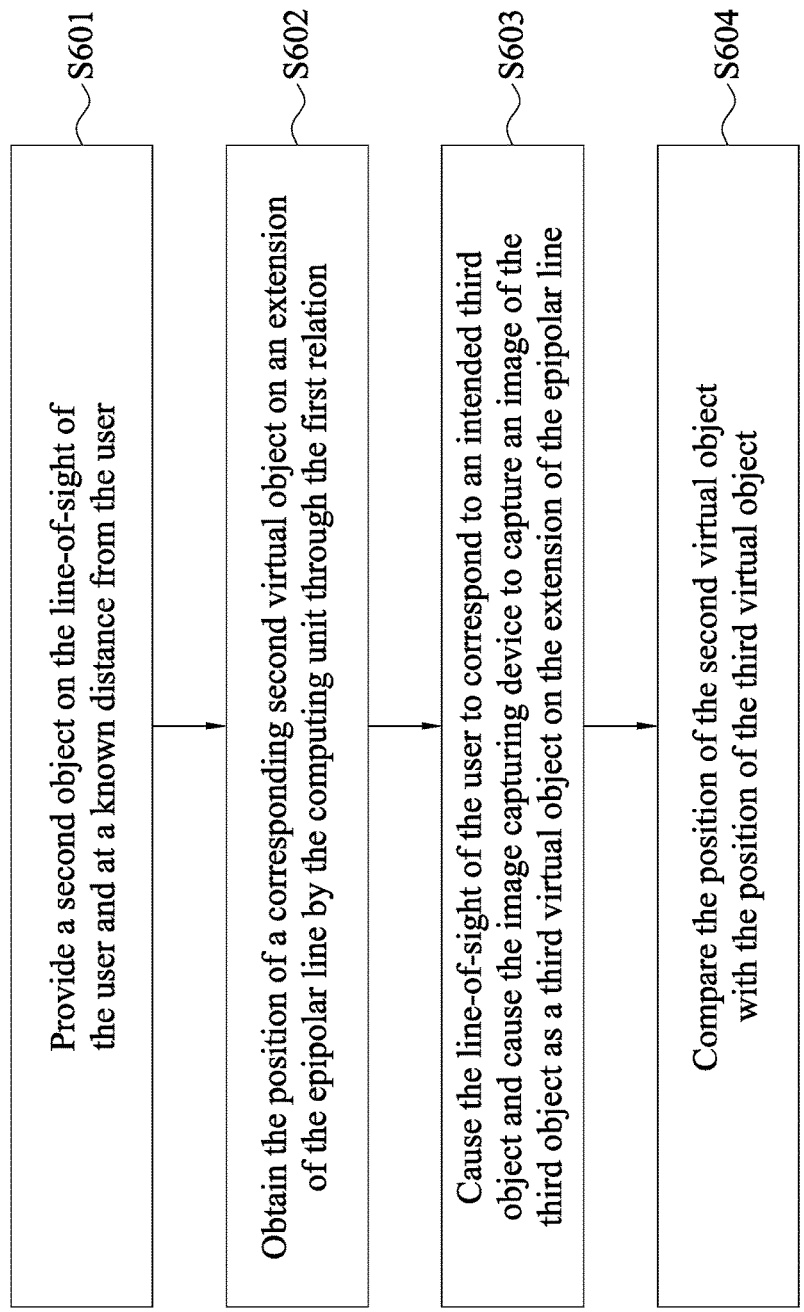
FIG. 6 is a schematic flow diagram showing a method for transforming between physical images and virtual images according to another aspect of the present invention.
Figure 7:
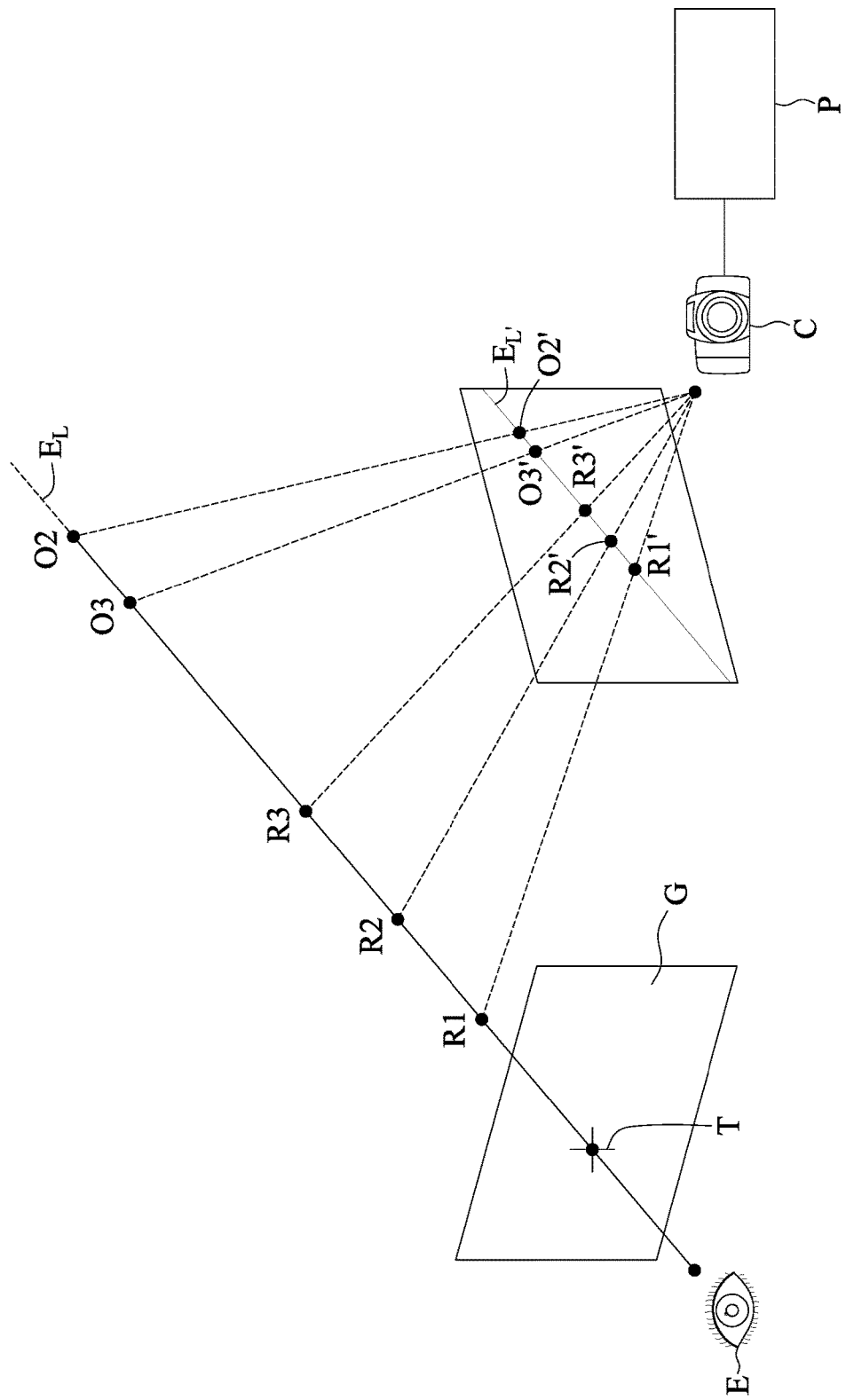
FIG. 7 is a schematic diagram of a structure using the method of FIG. 6.

FIG. 6 is a schematic flow diagram showing a method for transforming between physical images and virtual images according to another aspect of the present invention, and FIG. 7 is a schematic diagram of a structure using the method of FIG. 6.

Referring to FIGS. 6 and 7, step S601 is continued from step S103. At step S601, a second object O2 is provided on the line-of-sight $E_L$ of the user E and at a known distance from the user E. In particular, the computing unit P can cause the second object O2 to be generated on the line-of-sight $E_L$ of the user E and at a known distance from the user E, or the second object O2 can be first generated on the line-of-sight $E_L$ of the user E and at a known distance from the user E and then the distance between the second object O2 and the user E is informed to the computing unit P.

Then, at step S602, the position of a corresponding second virtual object O2' (corresponding to the second object O2) on an extension of the epipolar line $E_{L'}$ is obtained by the computing unit P through the first relation. In particular, step 602 is the reverse of step S402.

Thereafter, at step S603, the line-of-sight $E_L$ of the user E is made to correspond to an intended third object O3, and an image of the third object O3 is captured by the image capturing device C as a third virtual object O3' on the extension of the epipolar line $E_{L'}$. In particular, the user E gazes at a point in the physical space, i.e., the line-of-sight $E_L$ of the user E corresponds to the intended third object O3, and the user E uses voice, gesture or button control to cause the image capturing device C to capture an image of the third object O3.

Then, at step S604, the position (i.e., pixel position) of the second virtual object O2' is compared with the position (i.e., pixel position) of the third virtual object O3' by the computing unit P so as to determine whether the positions of the second virtual object O2' and the third virtual object O3' coincide with one another. The aspect of the present invention can be applied in such as a shooting game application.

According to another aspect of the present invention, a step similar to step S601 is performed, but the number of each of the second object O2, the second virtual object O2', the third object O3 and the third virtual object O3' is plural, and the steps from providing a second object O2 to capturing an image of the third object O3 are performed cyclically before comparing the positions of the second virtual objects O2' with the positions of the third virtual objects O3' by the computing unit P. That is, steps S601 to S603 are performed cyclically (but it is not necessary to capture all second objects O2) and then step S604 is performed. Alternatively, the steps from providing a second object O2 to comparing the position of the second virtual object O2' with the position of the third virtual object O3' by the computing unit P are performed cyclically. That is, steps S601 to S604 are performed sequentially.

Figure 8:
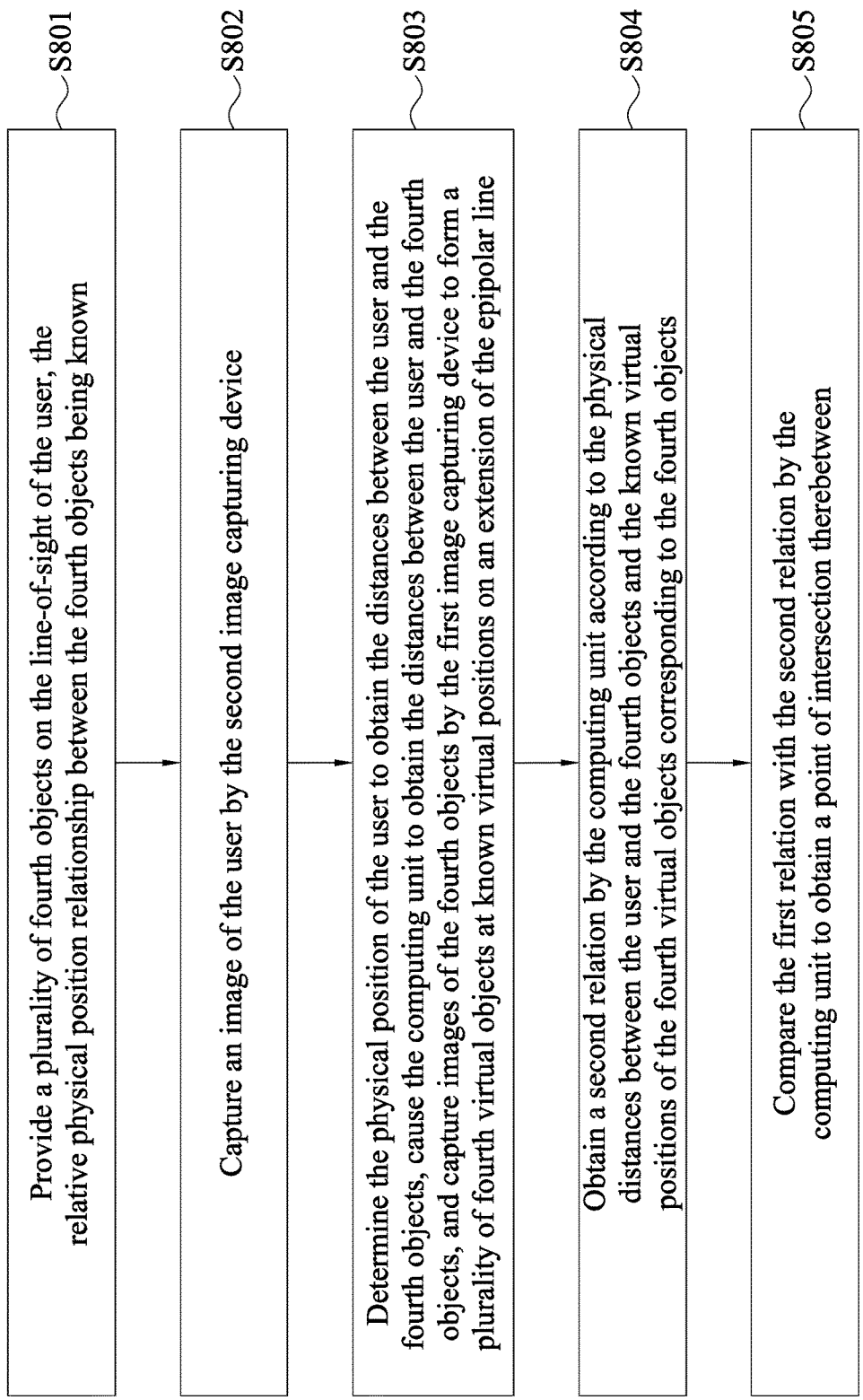
FIG. 8 is a schematic flow diagram showing a method for transforming between physical images and virtual images according to a further aspect of the present invention.
Figure 9:
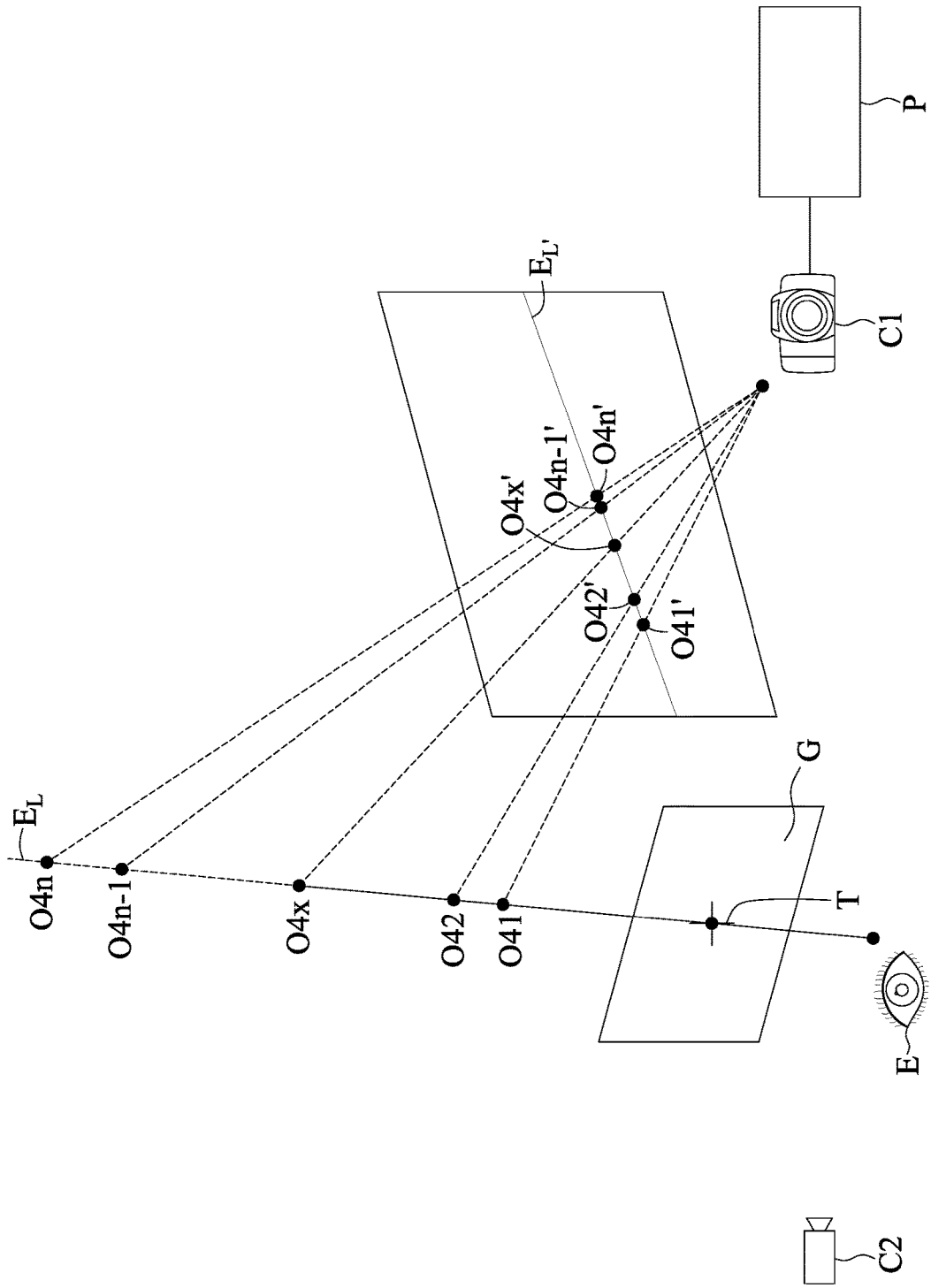
FIG. 9 is a schematic diagram of a structure using the method of FIG. 8.
Figure 10:
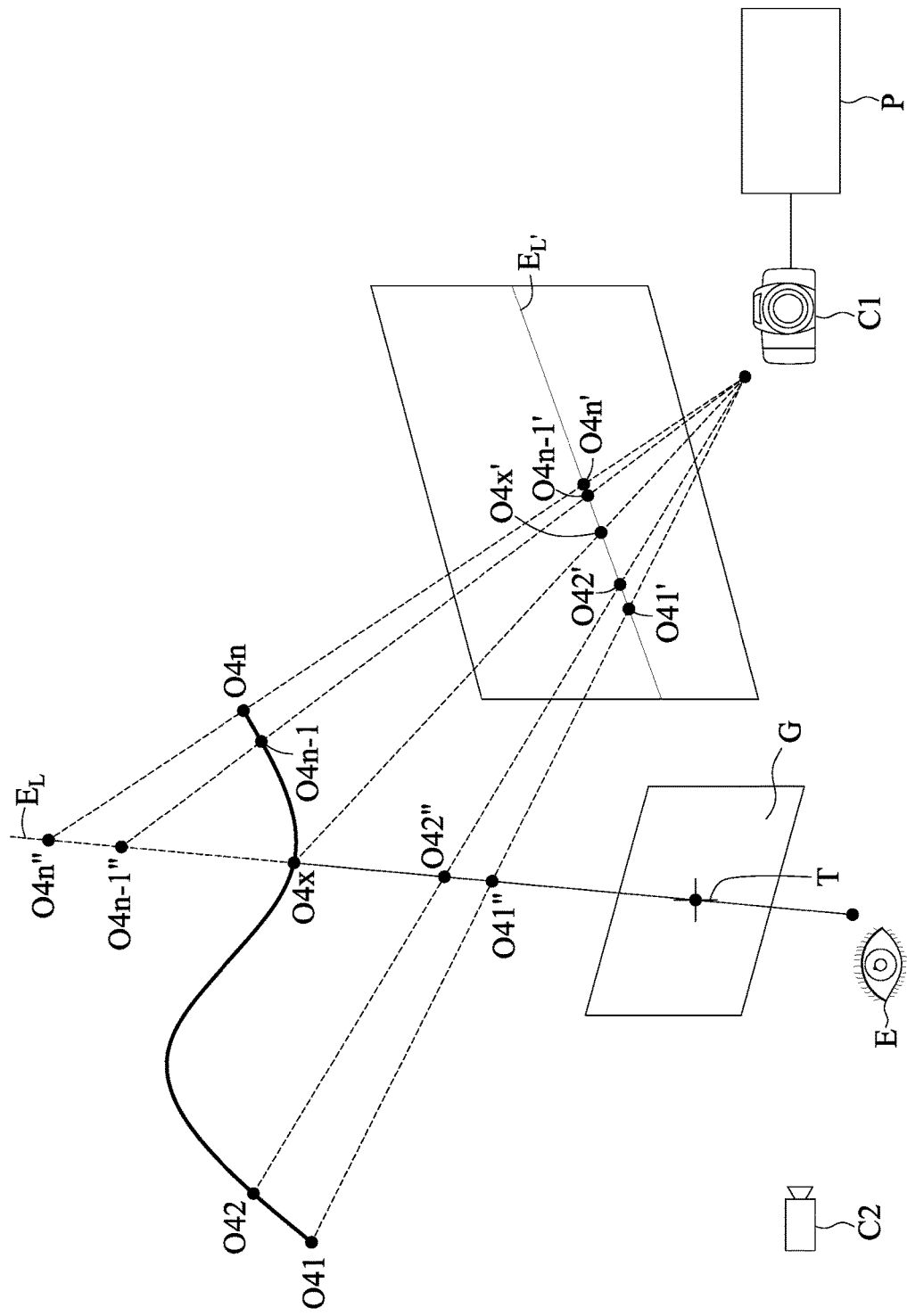
FIG. 10 is a schematic diagram showing a particular aspect of the structure of FIG. 9.
Figure 11:
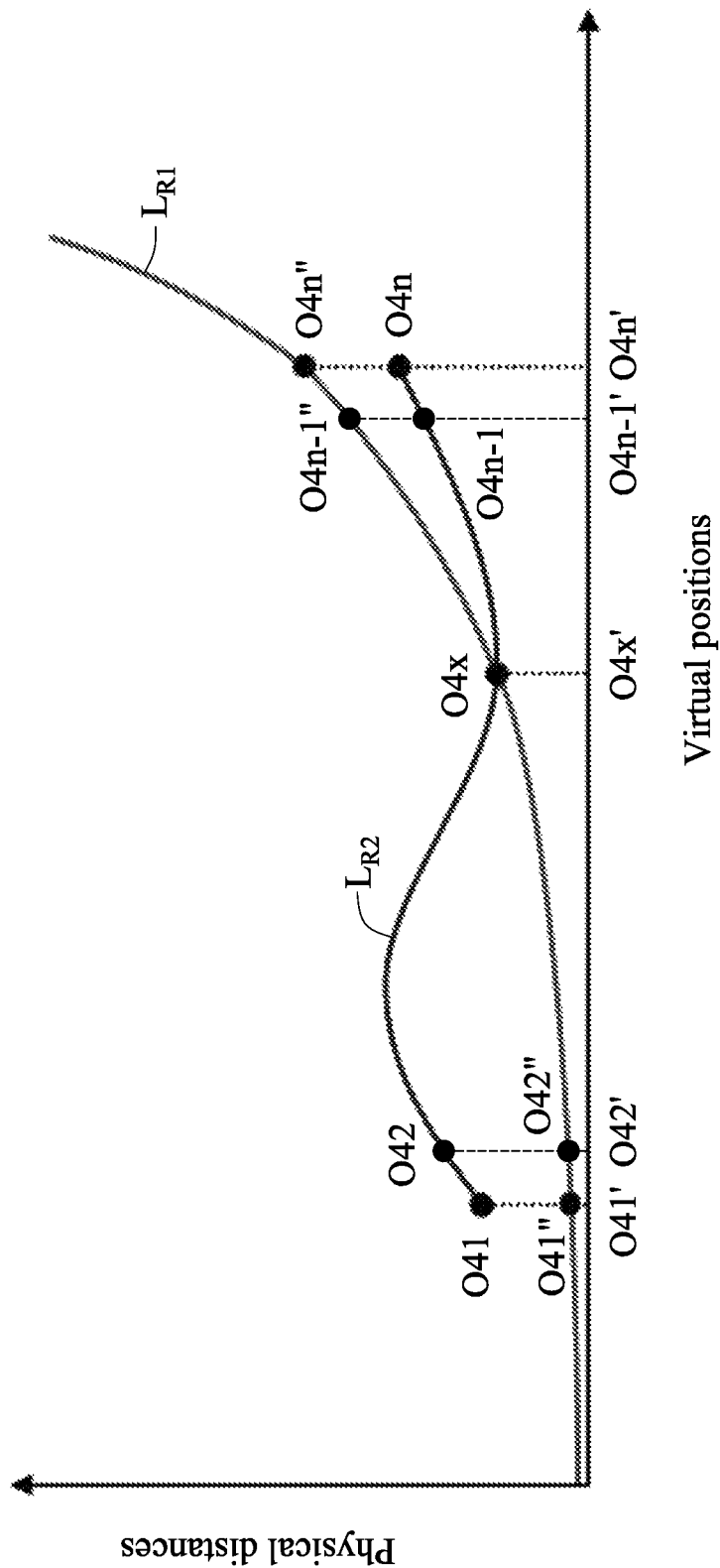
FIG. 11 is a plot diagram showing a result obtained from the method of FIG. 8.

FIG. 8 is a schematic flow diagram showing a method for transforming between physical images and virtual images according to a further aspect of the present invention, FIG. 9 is a schematic diagram of a structure using the method of FIG. 8, FIG. 10 is a schematic diagram showing a particular aspect of the structure of FIG. 9, and FIG. 11 is a plot diagram showing a result obtained from the method of FIG. 8.

Referring to FIGS. 8 to 11, before step S801, images of the first physical distance reference R1, the second physical distance reference R2 and the third physical distance reference R3 are captured by a first image capturing device C1 (i.e., the image capturing device C). Further, a second image capturing device C2 is disposed at a position that does not coincide with the line-of-sight $E_L$ of the user E and is different from the first image capturing device C1. Then, at step S801, continued from step S103, a plurality of fourth objects O41 to O4x are provided on the line-of-sight $E_L$ of the user E and the relative physical position relationship between the fourth objects O41 to O4x is known. The fourth objects O41 to O4x can be discrete or continuous, as shown in FIGS. 9 and 10. At least the fourth objects O41 to O4x are provided with identification information.

Then, at step S802, an image of the user E is captured by the second image capturing device C2.

Thereafter, at step S803, the physical position of the user E is determined by an external computing unit or the computing unit P that is wired or wireless coupled to the second image capturing device C2, thereby obtaining the distances between the user E and the fourth objects O41 to O4x. The computing unit P further obtains the distances between the user E and the fourth objects O41 to O4x. Since the relative physical position relationship between the fourth objects O41 to O4x and the position of the user E are known, the distances between the user E and the fourth objects O41 to O4x can be obtained. Furthermore, images of the fourth objects O41 to O4x are captured by the first image capturing device C1 to form a plurality of fourth virtual objects O41' to O4x' at known virtual positions (i.e., pixel positions) on an extension of the epipolar line $E_{L'}$. At least the fourth virtual objects O41' to O4x' are provided with identification information.

Then, similar to step S103, at step S804, a second relation curve L of a second relation is obtained by the computing unit P according to the physical distances between the user E and the fourth objects O41 to O4x and the known virtual positions of the fourth virtual objects O41' to O4x' corresponding to the fourth objects O41 to O4x.

Thereafter, at step S805, referring to FIG. 11, the first relation is compared with the second relation by the computing unit P so as to obtain a point of intersection therebetween, thus knowing the position where the user E gazes at.

Referring to FIG. 10, in a particular aspect, if some of the fourth objects O41 to O4n are not on the extension of the line-of-sight $E_L$ except O4x, since the relative position between the first image capturing device C1 and the user E is fixed, when the user E turns head to look at the fourth objects O41 to O4n, each of the fourth objects O41 to O4n can be seen as being projected on the extension of the original line-of-sight $E_L$ of step S102 so as to generate fourth projecting objects O41" to O4n" on the extension of the original line-of-sight $E_L$. Further, when the images of the fourth objects O41 to O4x are captured by the first image capturing device C1, the fourth virtual objects O41' to O4x' are still located on the extension of the original epipolar line $E_{L'}$. The second relation curve L is a curve constituted by the fourth projecting objects O41" to O4n" and the fourth virtual object O4x'.

Further, when the fourth objects O41 to O4x and/or the fourth virtual objects O41' to O4x' are provided with identification information, the identification information and corresponding data such as pictures can be used by the computing unit P and displayed by a display device (such as the visual device G) that is wired or wireless coupled to the computing unit P.

Referring to FIG. 2, the present invention further provides a system for transforming between physical images and virtual images. The system has an image capturing device C and a computing unit P.

As described above, the image capturing device C is disposed at a position that does not coincide with the line-of-sight $E_L$ of a user E for capturing images of at least three physical distance references (such as a first physical distance reference R1, a second physical distance reference R2, and a third physical distance reference R3) on the line-of-sight $E_L$ of the user E at different distances from the user E so as to obtain an epipolar line $E_{L'}$ formed by at least three virtual distance references (such as a first virtual distance reference R1', a second virtual distance reference R2', and a third virtual distance reference R3') corresponding respectively to the images.

The computing unit P is coupled to the image capturing device C for obtaining a first relation between the distances of the first to third physical distance references R1, R2, R3 from the user E and the positions of the first to third virtual distance references R1', R2', R3' on the epipolar line $E_{L'}$ according to a position corresponding relationship between the first to third physical distance references R1, R2, R3 and the first to third virtual distance references R1', R2', R3'.

Further, referring to FIG. 5, the present invention provides an aspect of the system. The difference of the system of FIG. 5 from the system of FIG. 2 is described as follows. A first object O1 is provided on an extension of the line-of-sight $E_L$ and the image capturing device C captures an image of the first object O1 on an extension of the epipolar line $E_{L'}$, so as to obtain a first virtual object O1' at a known position on the extension of the epipolar line $E_{L'}$.

According to the position corresponding relationship between the first to third physical distance references R1, R2, R3, the first to third virtual distance references R1', R2', R3' and the first virtual object O1', the computing unit P obtains the distance between the first object O1 and the user E through the first relation. Therein, the computing unit P obtains the distance between the first object O1 and the user E by using a cross-ratio equation.

Furthermore, referring to FIG. 7, the present invention provides a further aspect of the system. The difference of the system of FIG. 7 from the system of FIG. 2 is described as follows. A second object O2 is provided on the line-of-sight $E_L$ of the user E and at a known distance from the user E, and the computing unit P obtains the position of a corresponding second virtual object O2' (corresponding to the second object O2) on an extension of the epipolar line $E_{L'}$ through the first relation. Then, the line-of-sight $E_L$ of the user E corresponds to an intended third object O3, the image capturing device C captures an image of the third object O3 as a third virtual object O3' on the extension of the epipolar line $E_{L'}$, and the computing unit P compares the position of the second virtual object O2' with the position of the third virtual object O3'.

In addition, referring to FIG. 9, the present invention provides still another aspect of the system. The difference of the system of FIG. 9 from the system of FIG. 2 is described as follows. A second image capturing device C2 is disposed at a position that does not coincide with the line-of-sight $E_L$ of the user E and is different from the position of the first image capturing device C1 (i.e., the image capturing device C). A plurality of fourth objects O41 to O4x are provided on the line-of-sight $E_L$ of the user E, wherein the relative physical position relationship between the fourth objects O41 to O4x is known, and the second image capturing device C2 captures an image of the user E. Then, the computing unit P or an external computing unit determines the physical position of the user E to obtain the distances between the user E and the fourth objects O41 to O4x, and the first image capturing device C1 captures images of the fourth objects O41 to O4x to form a plurality of fourth virtual objects O41' to O4x' at known virtual positions on an extension of the epipolar line $E_{L'}$.

The computing unit P obtains a second relation curve L of the second relation according to the physical distances between the user E and the fourth objects O41 to O4x and the known virtual positions of the fourth virtual objects O41' to O4x' corresponding to the fourth objects O41 to O4x, and further compares the first relation with the second relation to obtain a point of intersection therebetween.

If some of the fourth objects O41 to O4n are not on the extension of the original line-of-sight $E_L$ except O4x, the second relation curve $L_{R2}$ is a curve constituted by the fourth projecting objects O41" to O4n" and the fourth virtual object O4x'.

Figure 12:
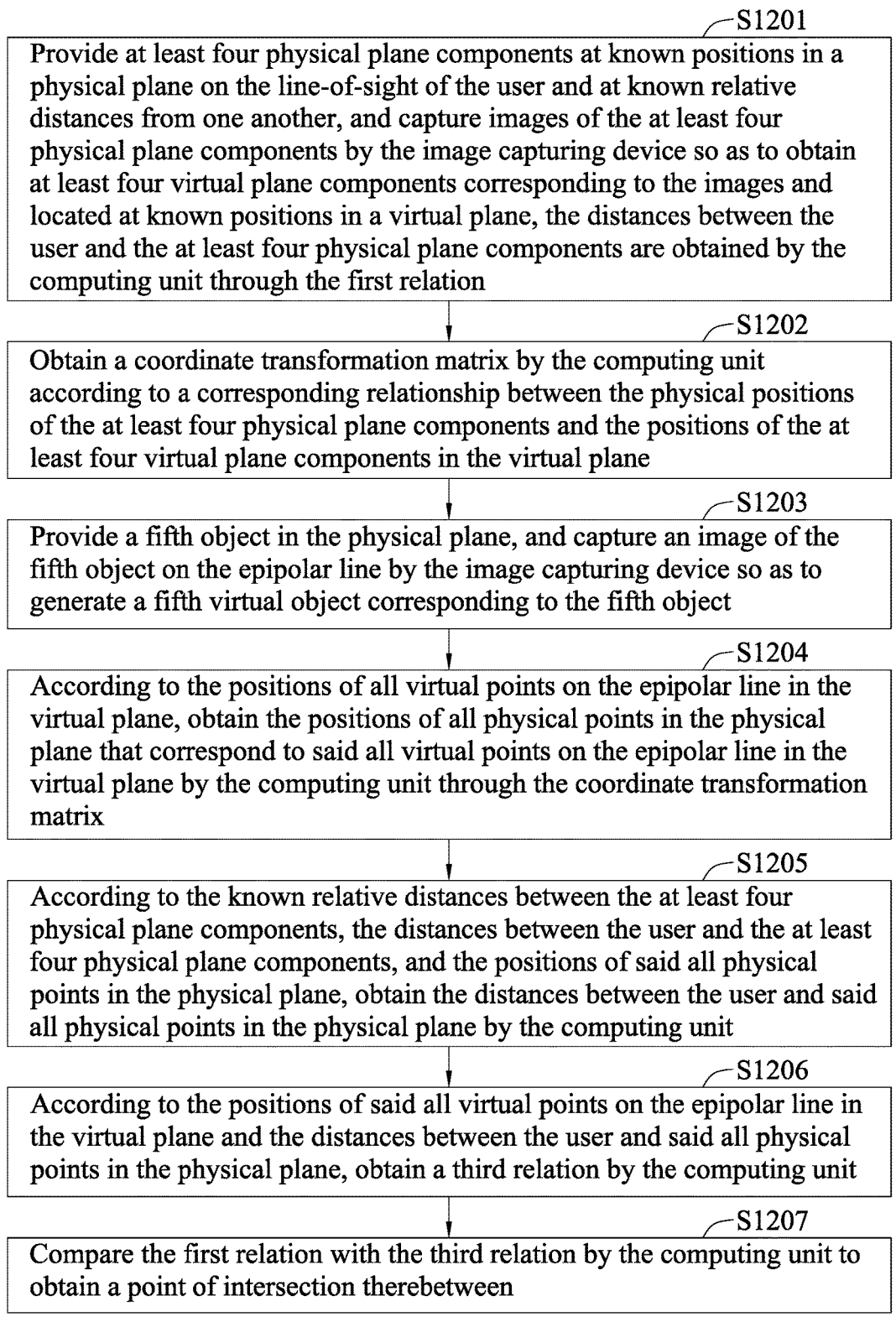
FIG. 12 is a schematic flow diagram showing a method for transforming between physical images and virtual images according to still another aspect of the present invention.
Figure 13:
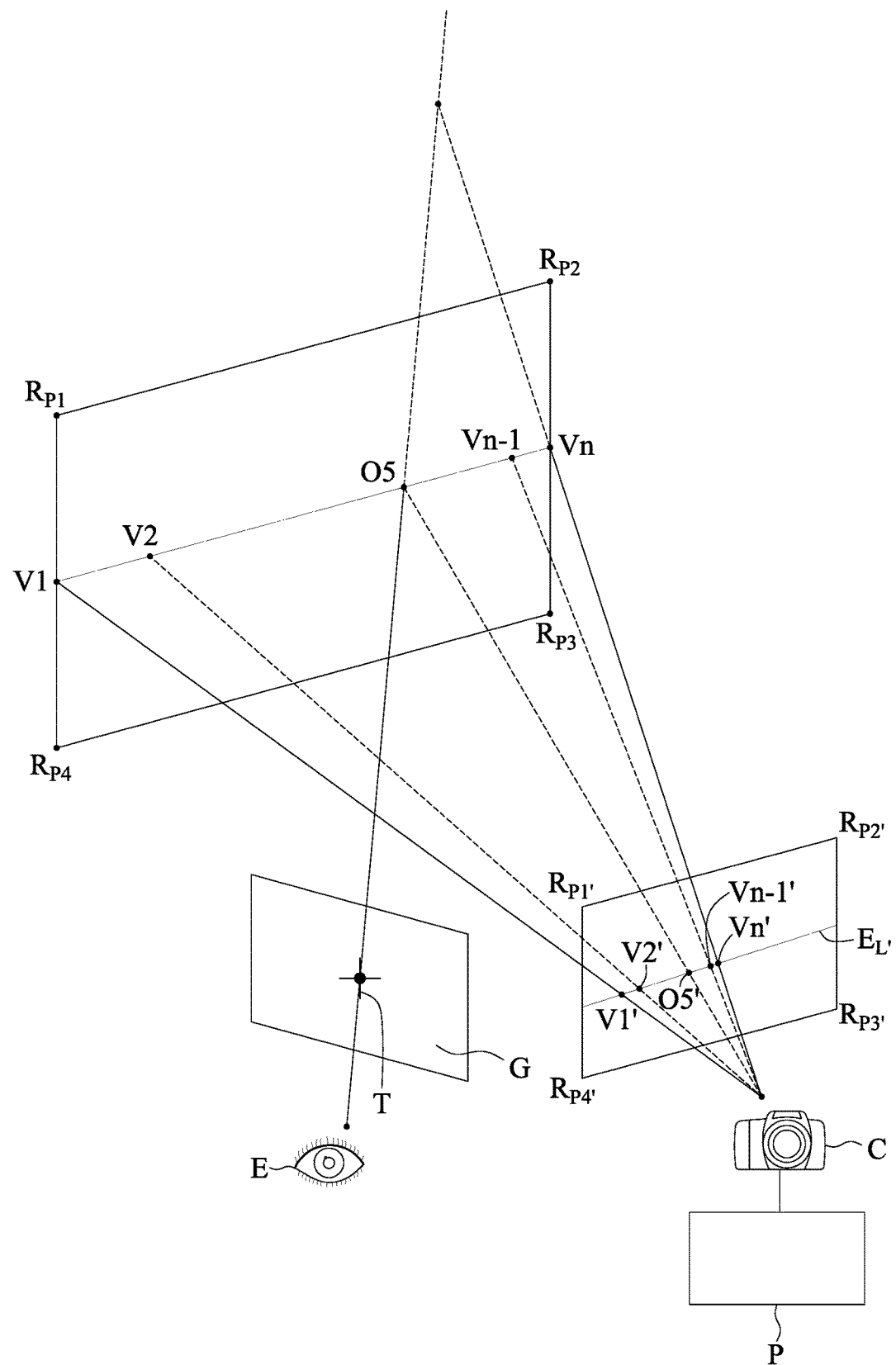
FIG. 13 is a schematic diagram of a structure using the method of FIG. 12.
Figure 14:
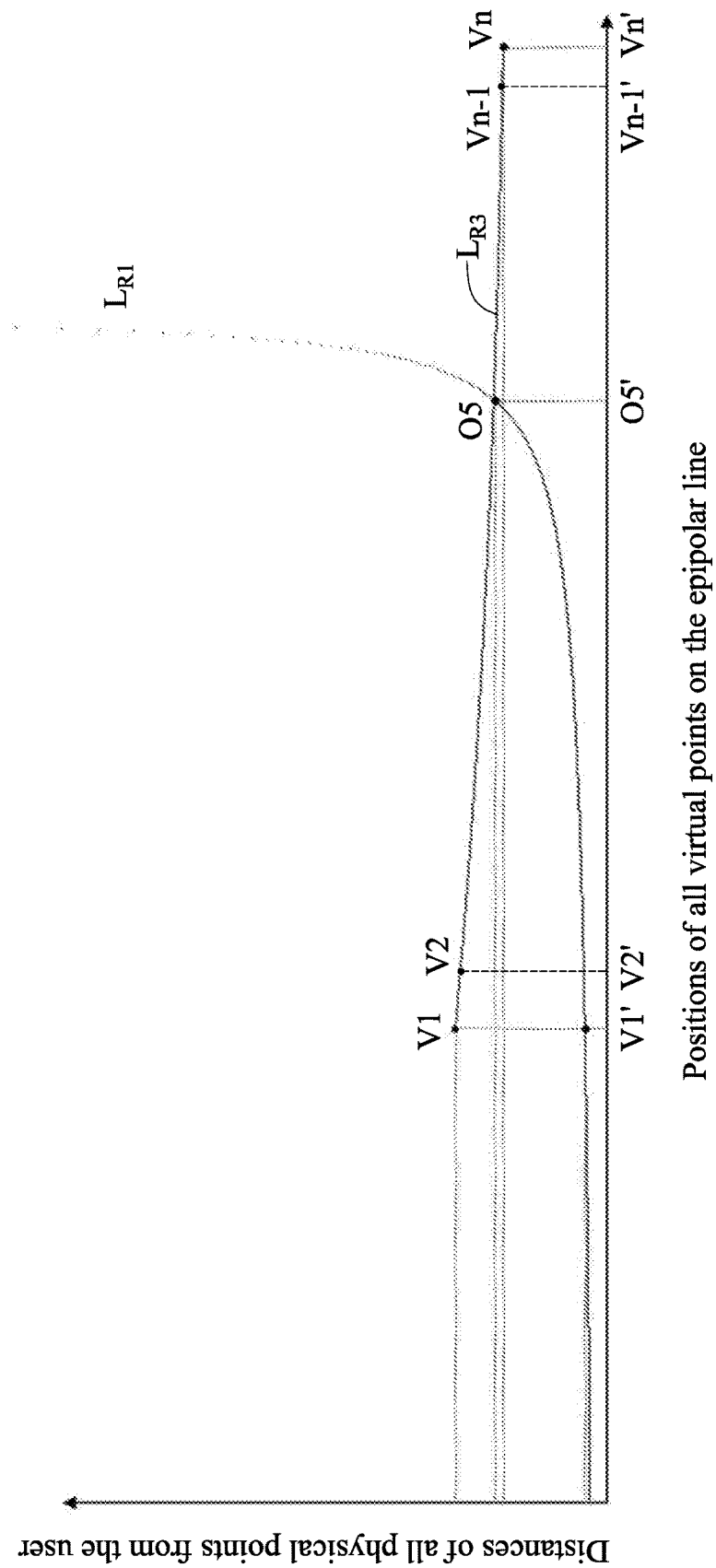
FIG. 14 is a plot diagram showing a result obtained from the method of FIG. 12.

FIG. 12 is a flow diagram showing a method for transforming between physical images and virtual images according to still another aspect of the present invention, FIG. 13 is a schematic diagram of a structure using the method of FIG. 12, and FIG. 14 is a plot diagram showing a result obtained from the method of FIG. 12.

Referring to FIGS. 12 to 14, at step S1201, continued from step S103, at least four physical plane components (such as a first physical plane component $R_{P1}$, a second physical plane component $R_{P2}$, a third physical plane component $R_{P3}$ and a fourth physical plane component $R_{P4}$) at known positions in a physical plane on the line-of-sight $E_L$ of the user E and at known relative distances from one another are provided, and images of the first to fourth physical plane components $R_{P1}$ to $R_{P4}$ are captured by the image capturing device C so as to obtain at least four virtual plane components (such as a first virtual plane component $R_{P1'}$, a second virtual plane component $R_{P2'}$, a third virtual plane component $R_{P3'}$ and a fourth virtual plane component $R_{P4'}$) corresponding to the images and located at known positions (i.e., pixel positions) in a virtual plane. The distances of the first to fourth physical plane components $R_{P1}$ to $R_{P4}$ from the user E are obtained by the computing unit P through the first relation.

Then, at step S1202, a coordinate transformation matrix H is obtained by the computing unit P according to a corresponding relationship between the physical positions of the first to fourth physical plane components $R_{P1}$ to $R_{P4}$ and the positions of the first to fourth virtual plane components $R_{P1'}$ to $R_{P4'}$ in the virtual plane. For example, the coordinate transformation matrix H is a homography matrix. That is, the coordinate transformation matrix H is obtained through the following equation (2).

$$X=HX' \quad (2)$$

Thereafter, at step S1203, a fifth object O5 is provided in the physical plane, and an image of the fifth object O5 on the epipolar line $E_{L'}$ is captured by the image capturing device C so as to generate a fifth virtual object O5' corresponding to the fifth object O5. In particular, after the fifth object O5 is provided in the physical plane, the line-of-sight $E_L$ of the user E should gaze at the fifth object O5 so as to ensure the image of the fifth object O5 captured by the image capturing device C is on the epipolar line $E_{L'}$. That is, the generated fifth virtual object O5' corresponding to the fifth object O5 is on the epipolar line $E_{L'}$.

Then, at step S1204, according to the positions of all virtual points V1' to Vn' on the epipolar line $E_{L'}$ in the virtual plane, the positions of all physical points V1 to Vn in the physical plane that correspond to said all virtual points V1' to Vn' on the epipolar line $E_{L'}$ in the virtual plane are obtained by the computing unit P through the coordinate transformation matrix H. In particular, from the epipolar line $E_{L'}$, the computing unit P can estimate a virtual segment $\overline{V1'Vn'}$ constituted by the virtual points V1' to Vn' and passing through the fifth virtual object O5'. Through an inverse matrix $H^{-1}$ of the coordinate transformation matrix H, the physical points V1 to Vn corresponding to the virtual points V1' to Vn' are obtained. Further, the physical point V1 falls on the segment constituted by the first physical plane component $R_{P1}$ and the fourth physical plane component $R_{P4}$, and the physical point Vn falls on the segment constituted by the second physical plane component $R_{P2}$ and the third physical plane component $R_{P3}$.

Then, at step S1205, similar to step S103, according to the known relative distances between the first, second, third and fourth physical plane components $R_{P1}$, $R_{P2}$, $R_{P3}$, $R_{P4}$, and the distances between the user E and the physical plane components $R_{P1}$, $R_{P2}$, $R_{P3}$, $R_{P4}$, and the positions of all physical points V1 to Vn in the physical plane, the distances between the user E and all physical points V1 to Vn in the physical plane are obtained by the computing unit P. For example, the computing unit P obtains the distances between the user E and all physical points V1 to Vn by using a cosine equation.

Then, at step S1206, referring to FIG. 14, according to the positions of all virtual points V1' to Vn' on the epipolar line $E_{L'}$ in the virtual plane and the distances between the user E and all physical points V1 to Vn in the physical plane, a third relation curve $L_{R3}$ is obtained by the computing unit P.

Thereafter, at step S1207, the first relation is compared with the third relation by the computing unit P so as to obtain a point of intersection therebetween, thus obtaining the position of the fifth object O5 in the physical space. From the point of intersection, an estimated position and distance of the fifth object O5 relative to the user E can be obtained, i.e., the y-axis value of the point corresponding to the fifth object O5 of FIG. 14.

Referring to FIG. 13, the present invention provides another aspect of the system for transforming between physical images and virtual images. The system has an image capturing device C disposed at a position that does not coincide with the line-of-sight $E_L$ of a user E and a computing unit P coupled to the image capturing device C.

The image capturing device C captures images of at least three physical distance references (such as a first physical distance reference R1, a second physical distance reference R2, and a third physical distance reference R3) located on the line-of-sight $E_L$ of the user E at different distances from the user E so as to obtain an epipolar line $E_{L'}$ formed by a first virtual distance reference R1', a second virtual distance reference R2' and a third virtual distance reference R3' corresponding respectively to the images. After at least four physical plane components (such as a first physical plane component $R_{P1}$, a second physical plane component $R_{P2}$, a third physical plane component $R_{P3}$ and a fourth physical plane component $R_{P4}$) are provided at known positions in a physical plane on the line-of-sight $E_L$ of the user E and at known relative distances from one another, the image capturing device C captures images of the first physical plane component $R_{P1}$, the second physical plane component $R_{P2}$, the third physical plane component $R_{P3}$ and the fourth physical plane component $R_{P4}$ so as to obtain at least four virtual plane components (such as a first virtual plane component $R_{P1'}$, a second virtual plane component $R_{P2'}$, a third virtual plane component $R_{P3'}$, and a fourth virtual plane component $R_{P4'}$) corresponding respectively to the images and located at known positions in a virtual plane. Further, after a fifth object O5 is provided in the physical plane, the image capturing device C captures an image of the fifth object O5 on the epipolar line $E_{L'}$ so as to generate a fifth virtual object O5' corresponding to the fifth object O5. In particular, after the fifth object O5 is provided in the physical plane, the line-of-sight $E_L$ of the user E should gaze at the fifth object O5 so as to ensure the image of the fifth object O5 captured by the image capturing device C is on the epipolar line $E_{L'}$. That is, the generated fifth virtual object O5' corresponding to the fifth object O5 is on the epipolar line $E_{L'}$. The computing unit P obtains a first relation between the distances of the first to third physical distance references R1 to R3 from the user E and the positions of the first to third virtual distance references R1' to R3' on the epipolar line $E_{L'}$ according to a position corresponding relationship between the first to third physical distance references R1 to R3 and the first to third virtual distance references R1' to R3'. Further, the computing unit P obtains the distances between the user E and the first to fourth physical plane components $R_{P1}$ to $R_{P4}$ through the first relation. Furthermore, the computing unit P obtains a coordinate transformation matrix H according to a corresponding relationship between the physical positions of the first to fourth physical plane components $R_{P1}$ to $R_{P4}$ and the positions of the first to fourth virtual plane components $R_{P1'}$ to $R_{P4'}$ in the virtual plane. In addition, the computing unit P obtains the positions of all physical points V1 to Vn in the physical plane that correspond to all virtual points V1' to Vn' on the epipolar line $E_{L'}$ in the virtual plane through the coordinate transformation matrix H according to the positions of all virtual points V1' to Vn' on the epipolar line $E_{L'}$ in the virtual plane. Also, the computing unit P obtains the distances between the user E and all physical points V1 to Vn in the physical plane according to the known relative distances between the first, second, third and fourth physical plane components $R_{P1}$ to $R_{P4}$ and the distances between the user E and the first to fourth physical plane components $R_{P1}$ to $R_{P4}$ and the positions of all physical points V1 to Vn in the physical plane. Furthermore, the computing unit P obtains a third relation according to the positions of all virtual points V1' to Vn' on the epipolar line $E_{L'}$ in the virtual plane and the distances between the user E and all physical points V1 to Vn in the physical plane Finally, the computing unit P compares the first relation with the third relation so as to obtain a point of intersection therebetween. From the point of intersection, an estimated position and distance of the fifth object O5 relative to the user E can be obtained, i.e., the y-axis value of the point corresponding to the fifth object O5 of FIG. 14.

Therefore, by using an image capturing device that is located at a fixed position relative to the user and does not coincide with the line-of-sight of the user, the present invention captures images of substances (physical distance references) to generate virtual images. Further, by using a computing unit, the present invention obtains the physical position of an object through the position relation between the physical positions of the substances and the virtual positions of the virtual images in a virtual space (pixel coordinates). As such, the resultant structure is light and easy to wear. Further, the present invention eliminates the need of an additional handheld device, prevents the vision of the user from being interfered with, allows to perform pointing and/or distance measuring functions on any object point on a surface (plane) of a known object, and does not need to emit a distance measuring signal.

The above-described descriptions of the detailed embodiments are only to illustrate the preferred implementation according to the present invention, and it is not to limit the scope of the present invention. Accordingly, all modifications and variations completed by those with ordinary skill in the art should fall within the scope of present invention defined by the appended claims.

What is claimed is:

1. A method for transforming between physical images and virtual images, comprising:

disposing a first image capturing device at a position that does not coincide with line-of-sight of a user;

providing at least three physical distance references on the line-of-sight of the user at different distances from the user, and capturing images of the at least three physical distance references by the first image capturing device so as to obtain an epipolar line formed by at least three virtual distance references corresponding respectively to the images; and obtaining, by a computing unit that is coupled to the first image capturing device, a first relation between distances of the at least three physical distance references from the user and positions of the at least three virtual distance references on the epipolar line according to a position corresponding relationship between the at least three physical distance references and the at least three virtual distance references, after the first relation is obtained, the method further comprising:

providing a first object on an extension of a straight line formed by the at least three physical distance references, and capturing an image of the first object on an extension of the epipolar line by the first image capturing device so as to obtain a first virtual object on the extension of the epipolar line and a position of the first virtual object;

providing a second object on the line-of-sight of the user and at a known distance from the user;

obtaining, by the computing unit through the first relation, a position of a corresponding second virtual object on the extension of the epipolar line;

causing the line-of-sight of the user to correspond to an intended third object and causing the first image capturing device to capture an image of the third object as a third virtual object on the extension of the epipolar line; and comparing, by the computing unit, a position of the second virtual object with a position of the third virtual object.

2. The method of claim 1, after the first relation is obtained, further comprising:

obtaining, by the computing unit through the first relation, a distance between the first object and the user according to a position corresponding relationship between the at least three physical distance references, the at least three virtual distance references and the first virtual object.

3. The method of claim 2, wherein the computing unit obtains the distance between the first object and the user by using a cross-ratio equation.

4. The method of claim 1, wherein a number of each of the second object, the second virtual object, the third object and the third virtual object is plural, and the steps from providing the second object to capturing the image of the third object are performed cyclically before the positions of the second virtual objects are compared with the positions of the third virtual objects by the computing unit, or the steps from providing the second object to comparing the position of the second virtual object with the position of the third virtual object by the computing unit are performed cyclically.

5. The method of claim 1, further comprising disposing a second image capturing device at a position that does not coincide with the line-of-sight of the user and is different from a position of the first image capturing device, and, after the first relation obtained, comprising:

providing a plurality of fourth objects on the line-of-sight of the user, wherein a relative physical position relationship between the fourth objects is known;

capturing an image of the user by the second image capturing device;

determining a physical position of the user to obtain distances between the user and the fourth objects by the computing unit, and capturing images of the fourth objects by the first image capturing device to form a plurality of fourth virtual objects at known virtual positions on the extension of the epipolar line;

obtaining a second relation by the computing unit according to physical distances between the user and the fourth objects and the known virtual positions of the fourth virtual objects corresponding to the fourth objects; and comparing, by the computing unit, the first relation with the second relation to obtain a point of intersection therebetween.

6. The method of claim 5, wherein the fourth virtual objects are provided with identification information.

7. The method of claim 1, further comprising using a visual device disposed between the user and the at least three physical distance references to display a mark arranged in a line with the at least three physical distance references.

8. A method for transforming between physical images and virtual images, comprising:

disposing a first image capturing device at a position that does not coincide with line-of-sight of a user;

providing at least three physical distance references on the line-of-sight of the user at different distances from the user, and capturing images of the at least three physical distance references by the first image capturing device so as to obtain an epipolar line formed by at least three virtual distance references corresponding respectively to the images; and obtaining, by a computing unit that is coupled to the first image capturing device, a first relation between distances of the at least three physical distance references from the user and positions of the at least three virtual distance references on the epipolar line according to a position corresponding relationship between the at least three physical distance references and the at least three virtual distance references, after the first relation is obtained, the method further comprising:

providing at least four physical plane components at known positions in a physical plane on the line-of-sight of the user and at known relative distances from one another, and capturing images of the at least four physical plane components by the first image capturing device so as to obtain at least four virtual plane components corresponding respectively to the images and located at known positions in a virtual plane, wherein distances between the user and the at least four physical plane components are obtained by the computing unit through the first relation;

obtaining a coordinate transformation matrix by the computing unit according to a corresponding relationship between physical positions of the at least four physical plane components and positions of the at least four virtual plane components in the virtual plane;

providing an object in the physical plane, and capturing an image of the object on the epipolar line by the first image capturing device so as to generate a virtual object corresponding to the object;

according to positions of all virtual points on the epipolar line in the virtual plane and the virtual object, obtaining positions of all physical points in the physical plane that correspond to said all virtual points on the epipolar line in the virtual plane by the computing unit through the coordinate transformation matrix;

according to the known relative distances between the at least four physical plane components, the distances between the user and the at least four physical plane components, and the positions of said all physical points in the physical plane, obtaining distances between the user and said all physical points in the physical plane by the computing unit;

according to the positions of said all virtual points on the epipolar line in the virtual plane and the virtual object and the distances between the user and said all physical points in the physical plane, obtaining a third relation by the computing unit; and comparing the first relation with the third relation by the computing unit to obtain a point of intersection therebetween.

9. The method of claim 8, wherein the coordinate transformation matrix is a homography matrix, and the computing unit obtains the all physical points and the distances between the user and the all physical points by using a cosine equation.

10. A system for transforming between physical images and virtual images, comprising:

a first image capturing device disposed at a position that does not coincide with line-of-sight of a user for capturing images of at least three physical distance references on the line-of-sight of the user at different distances from the user so as to obtain an epipolar line formed by at least three virtual distance references corresponding respectively to the images; and a computing unit coupled to the first image capturing device for obtaining a first relation between distances of the at least three physical distance references from the user and positions of the at least three virtual distance references on the epipolar line according to a position corresponding relationship between the at least three physical distance references and the at least three virtual distance references, wherein after the first relation is obtained:

a first object is provided on an extension of a straight line formed by the at least three physical distance references, and the first image capturing device captures an image of the first object on an extension of the epipolar line so as to obtain a first virtual object at a known position on the extension of the epipolar line, and a second object is provided on the line-of-sight of the user and at a known distance from the user and then the line-of-sight of the user corresponds to an intended third object, the computing unit obtains a position of a corresponding second virtual object on an extension of the epipolar line through the first relation, the first image capturing device captures an image of the third object as a third virtual object on the extension of the epipolar line, and the computing unit compares a position of the second virtual object with a position of the third virtual object.

11. The system of claim 10, wherein after the first relation is obtained, according to a position corresponding relationship between the at least three physical distance references, the at least three virtual distance references and the first virtual object, the computing unit obtains a distance between the first object and the user through the first relation.

12. The system of claim 11, wherein the computing unit obtains the distance between the first object and the user by using a cross-ratio equation.

13. The system of claim 10, further comprising a second image capturing device disposed at a position that does not coincide with the line-of-sight of the user and is different from a position of the first image capturing device, and wherein, after the first relation is obtained, a plurality of fourth objects are provided on the line-of-sight of the user, wherein a relative physical position relationship between the fourth objects is known, the second image capturing device captures an image of the user, the first image capturing device captures images of the fourth objects to form a plurality of fourth virtual objects at known virtual positions on the extension of the epipolar line, the computing unit or an external computing unit determines the physical position of the user to obtain distances between the user and the fourth objects, as such, after obtaining the distances between the user and the fourth objects, the computing unit obtains a second relation according to physical distances between the user and the fourth objects and the known virtual positions of the fourth virtual objects corresponding to the fourth objects, and further compares the first relation with the second relation to obtain a point of intersection therebetween.

14. The system of claim 13, wherein the fourth virtual objects are provided with identification information.

15. The system of claim 10, further comprising a visual device disposed between the user and the at least three physical distance references to display a mark arranged in a line with the at least three physical distance references.

16. A system for transforming between physical images and virtual images, comprising:

a first image capturing device disposed at a position that does not coincide with line-of-sight of a user, wherein the first image capturing device captures images of at least three physical distance references located at an approximate straight line on the line-of-sight of the user at different distances from the user so as to obtain an epipolar line formed by at least three virtual distance references corresponding respectively to the images, after at least four physical plane components are provided at known positions in a physical plane on the line-of-sight of the user and at known relative distances from one another, the first image capturing device captures images of the at least four physical plane components so as to obtain at least four virtual plane components corresponding respectively to the images and located at known positions in a virtual plane, and after an object is provided in the physical plane, the first image capturing device captures an image of the object on the epipolar line so as to generate a virtual object corresponding to the object; and a computing unit coupled to the first image capturing device, wherein the computing unit obtains a first relation between distances of the at least three physical distance references from the user and positions of the at least three virtual distance references on the epipolar line according to a position corresponding relationship between the at least three physical distance references and the at least three virtual distance references, the computing unit further obtains distances between the user and the at least four physical plane components through the first relation, and obtains a coordinate transformation matrix according to a corresponding relationship between physical positions of the at least four physical plane components and positions of the at least four virtual plane components in the virtual plane, further, the computing unit obtains positions of all physical points in the physical plane that correspond to all virtual points on the epipolar line in the virtual plane through the coordinate transformation matrix according to positions of said all virtual points on the epipolar line in the virtual plane, also, the computing unit obtains distances between the user and said all physical points in the physical plane according to the known relative distances between the at least four physical plane components and the distances between the user and the at least four physical plane components and the positions of said all physical points in the physical plane, furthermore, the computing unit obtains a third relation according to the positions of said all virtual points on the epipolar line in the virtual plane and the distances between the user and said all physical points in the physical plane, and then compares the first relation with the third relation to obtain a point of intersection therebetween.

17. The system of claim 16, wherein the coordinate transformation matrix is a homography matrix, and the computing unit obtains said all physical points and the distances between the user and said all physical points by using a cosine equation.

18. The system of claim 16, further comprising a visual device disposed between the user and the at least three physical distance references to display a mark arranged in a line with the at least three physical distance references.

* * * * *